United States Patent

King et al.

[11] 4,287,251
[45] Sep. 1, 1981

[54] DISPOSABLE ABSORBENT NONWOVEN STRUCTURE

[76] Inventors: Mary K. King, 301 Leonora Dr., Memphis, Tenn. 38117; William J. Boyd, 4794 N. Milnor, Memphis, Tenn. 38128

[21] Appl. No.: 916,298

[22] Filed: Jun. 16, 1978

[51] Int. Cl.³ .............. B32B 27/14; D04H 1/04; A61L 15/00; A61F 13/00
[52] U.S. Cl. .................... 428/198; 128/156; 128/290 W; 128/296; 428/284; 428/286; 428/296; 428/298; 428/302
[58] Field of Search ............. 428/198, 298, 296, 302, 428/284, 286; 128/296, 290 W, 156

[56] References Cited

U.S. PATENT DOCUMENTS

| | | | |
|---|---|---|---|
| 3,257,259 | 6/1966 | Law | 428/298 X |
| 3,396,420 | 8/1968 | Mitchell | 428/298 X |
| 3,485,705 | 12/1969 | Harmon | 428/286 X |
| 3,683,921 | 8/1972 | Brooks et al. | 128/296 |
| 3,837,995 | 9/1974 | Floden | 428/298 X |
| 3,867,935 | 2/1975 | Eisdorfer et al. | 128/156 |
| 3,958,055 | 5/1976 | Hardley et al. | 428/198 |
| 4,075,382 | 2/1978 | Chapman et al. | 428/192 |

Primary Examiner—Thomas J. Herbert, Jr.
Attorney, Agent, or Firm—Frost & Jacobs

[57] ABSTRACT

Disposable absorbent structures comprising alternate layers of absorbent nonwoven material and nonwoven hydrophobic thermoplastic material, minimally bonded together. The outer layers of the structures are of absorbent nonwoven material and the structures comprise at least two such absorbent layers and at least one nonwoven hydrophobic thermoplastic layer. The hydrophobic thermoplastic material may comprise one or more webs of any appropriate polymer and of any structural form having an open area sufficient to permit the free passage of liquids therethrough. The absorbent layers may comprise spunbonded rayon webs or webs of air laid, wet laid or carded rayon fibers of staple length or longer, with or without mechanical or hydraulic needling. The outer absorbent layers may also comprise stabilized rayon webs and the inner absorbent plies, when the ultimate desired characteristics of the absorbent structure will permit, may be of other cellulosic materials such as layers of tissue, fluff, wadding and the like. The absorbent structures demonstrate synergistic absorbency, excellent wet and dry bulk, low lint discharge and a cloth-like aesthetic primarily consisting of quietness and good hand, including such attributes as drape, softness and flexibility.

13 Claims, 6 Drawing Figures o ABSORBENT LAYERS
□ ABSORBENT LAYERS PLUS NON-ABSORBENT LAYERS

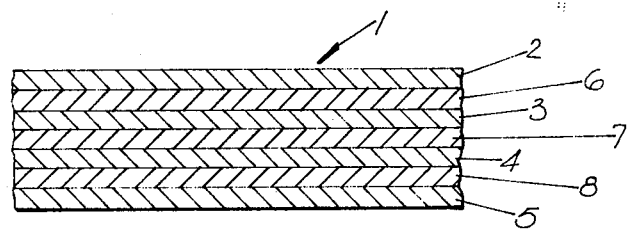
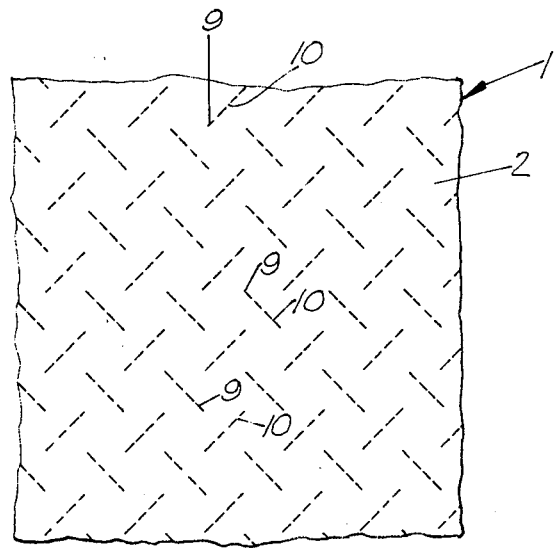
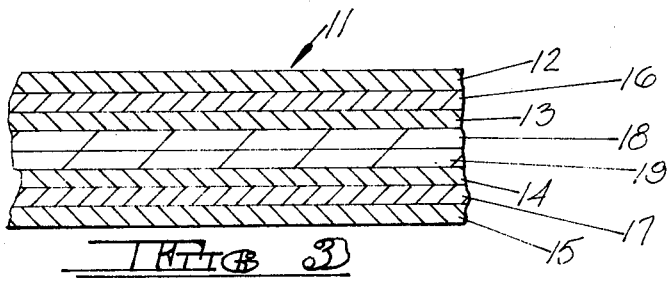

○ ABSORBENT LAYERS
□ ABSORBENT LAYERS PLUS NON-ABSORBENT LAYERS

DISPOSABLE ABSORBENT NONWOVEN STRUCTURE

BACKGROUND OF THE INVENTION

1. Field of the Invention

The invention relates to disposable, nonwoven, absorbent structures and particularly to such structures characterized by synergistic absorbency, excellent wet and dry bulk, low lint discharge and a cloth-like aesthetic.

2. Description of the Prior Art

The absorbent structures of the present invention have many applications and in fact may be used wherever their unique absorbency and wet and dry bulk characteristics would be advantageous. By careful selection of the materials constituting the alternate layers of absorbent nonwoven material and nonwoven hydrophobic thermoplastic material, the absorbent structures of the present invention may be engineered to serve many appropriate end uses.

While not intended to be so limited, the absorbent structures of the present invention will be described primarily in terms of their application as surgical sponges. The choice to so describe the absorbent structures has been made for two reasons. First of all, the absorbent structures of the present invention lend themselves particularly well to such surgical applications, and secondly, the requirements for such surgical applications are generally far more stringent than those for other applications.

Of the various types of known surgical sponges, one which is very commonly used is generally known as a laparotomy sponge, pad or strip. While its use is not necessarily so limited, the name of this type of sponge is derived primarily because it is extensively employed in laparotomy procedures involving entrance into the abdominal cavity through the abdominal wall. Laparotomy sponges have many applications, frequently involving introduction of the sponge into the wound or abdominal cavity. They are used, for example, to absorb large quantities of blood, body fluids or the like, to "wall-off" organs not involved in the surgical procedure and to assist in the handling of organs. Laparotomy sponges have hitherto most commonly been made of a plurality of plies of cotton gauze sewn together, or of gauze plies surrounding a core of absorbent material.

Laparotomy sponges made of cotton gauze are normally intended for reuse and are characterized by a number of disadvantages. First of all, gauze sponges are relatively expensive and, to achieve adequate absorbency, a relatively large number of gauze plies is required. Since such gauze structures are intended for reuse, this involves the time and expense of washing and sterilization together with the individual hand work required in sorting, folding and the like. Reusable structures always involve some danger of cross-contamination. Furthermore, cotton gauze structures of this type are subject to linting and lint, when left in a wound or in the body cavity, may lead to such post-operative problems as inflammation, adhesions and the formation of granulomas.

Despite these various drawbacks, cotton gauze sponges are characterized by good surface aesthetics inclusive of surface texture and hand. They also possess adequate wet and dry bulk. An exemplary cotton gauze laparotomy sponge is taught in U.S. Pat. No. 3,698,393, in the name of Charles E. Stone, issued Oct. 17, 1972.

U.S. Pat. No. 3,837,344 in the name of Donald Patience, issued Sept. 24, 1974, sets forth a laparotomy sponge formed of a plurality of gauze plies, the yarns of each ply being kinked, convoluted and twisted into interengagement with the yarns of adjacent gauze plies. In U.S. Pat. No. 4,068,666, in the name of James A. Shiff, issued Jan. 17, 1978, a surgical sponge is taught having an absorbent core of natural or synthetic fibers surrounded by outer layers of gauze or other grid materials, such as nonwoven polyester material. Yet another woven cotton surgical sponge is illustrated in U.S. Pat. No. 3,965,907 in the names of David R. Hardy and Richard C. Weatherford, issued June 29, 1976. U.S. Pat. No. 3,971,381, in the name of Robert T. Gibson, issued July 27, 1976 sets forth a laparotomy sponge comprising a central core of mixed rayon and polypropylene fibers pressed into a batt and heat bonded. The batt is then given waffled surfaces by means of a knurled roll, the surfaces having a diamond pattern of alternate raised and depressed areas. This core material is surrounded by cotton gauze outer layers.

Prior art workers have turned their attention to the provision of disposable surgical sponges, attempting to equal or better the advantages of gauze sponges, while overcoming their disadvantages. U.S. Pat. No. 3,837,950 in the name of Harry G. Reimels, issued Sept. 24, 1974 teaches a surgical sponge for delicate surgical procedures comprising a relatively thin strip of nonwoven fibers securely bonded together by a mixture of starch and polyvinyl alcohol. A disposable absorbent sponge made up of a plurality of reinforced nonwoven textile fabrics is set forth in U.S. Pat. No. 3,683,921 in the names of Berry A. Brooks and Norman R. Eisdorfer, issued Aug. 15, 1972. Each reinforced nonwoven textile fabric layer comprises a synthetic polymeric thermoplastic reinforcing reticulate grid netting covered on each side by at least one layer of overlapping, intersecting fibers mechanically intertwined around and bonded to the individual elements of the grid netting. Surfactant treated polyurethane sponges are taught in U.S. Pat. No. 3,566,871 in the names of Ferdinand J. Richter and Charles T. Riall, issued Mar. 2, 1971 and in U.S. Pat. No. 3,961,629 in the name of the same inventors, issued June 8, 1976. Finally, in U.S. Pat. No. 3,867,935 in the names of Norman R. Eisdorfer, John M. Lesniak and Bernard M. Lichstein, issued Feb. 24, 1975, there is described a laparotomy pad comprising a plurality of plies of hydraulically entangled hydrophilic fibers interlayered with thin thermoplastic grids.

The disposable nonwoven structures and surgical sponges of the present invention are easily and inexpensively manufactured, are intended to be disposable and are free of the disadvantages possessed by prior art gauze structures. The disposable nonwoven absorbent structures of the present invention demonstrate excellent wet and dry bulk in combination with synergistic absorbency and cloth-like aesthetics. The phrase "cloth-like aesthetics" as used herein refers to softness, tactility, texture, appearance and other properties contributing to the overall impression of the material. Of particular importance in surgical uses is the fact that these nonwoven absorbent structures are essentially free of lint or particulate discharge. They are possessed of excellent drape, conformability, pliability and softness and are non-abrasive to delicate tissue. The hydrophobic thermoplastic layers can serve as a dry adhesive, enabling the structures to be minimally heat bonded.

The structures, particularly when intended for surgical uses, are preferably free of additional bonding agents and other additives such as surfactants (including wetting agents), surface finishes and the like, which might leach into a wound.

SUMMARY OF THE INVENTION

The present invention is directed to disposable, nonwoven, absorbent structures in general, and in particular to such structures intended for surgical uses such as surgical sponges. The disposable absorbent structures comprise alternate layers of absorbent nonwoven material and nonwoven hydrophobic thermoplastic material, the structure as a whole being minimally bonded together. The outer layers of the structures are always absorbent layers and therefore the simplest form of an absorbent structure of the present invention comprises two layers of absorbent nonwoven material with a single layer of nonwoven hydrophobic thermoplastic material located therebetween. The number of layers of absorbent nonwoven material and nonwoven hydrophobic thermoplastic material does not constitute a limitation on the present invention with the exception that there should always be one more layer of absorbent nonwoven material than nonwoven hydrophobic thermoplastic material.

The nonwoven absorbent material may comprise spun-bonded rayon webs or webs of air laid, wet laid or carded rayon fibers of staple length or longer, with or without mechanical or hydraulic needling. Where the outer nonwoven absorbent layers are desired to have dimensional stability, improved tensile strength and resistance to surface abrasion, they may comprise stabilized rayon webs, as will be defined hereinafter. When the ultimate desired characteristics of the absorbent structure will permit, the inner absorbent layers may comprise other cellulosic materials such as layers of tissue, fluff, wadding and the like.

The hydrophobic thermoplastic material may comprise one or more webs of any appropriate polymer and of any structural web-like form having an open area sufficient to permit the free passage of liquids therethrough.

When the absorbent structures of the present invention are intended for use as surgical aids, such as laparotomy sponges, the preferred absorbent layer material is continuous filament spunbonded rayon. The preferred hydrophobic thermoplastic layer material is a web of polypropylene or polyethylene. Such absorbent and hydrophobic thermoplastic layers are generally recognized to be safe for surgical uses.

Exemplary embodiments of the present invention may take the form of laparotomy sponges preferably comprising alternate webs of spunbonded rayon and extruded and embossed polyethylene or expanded polypropylene. Both extruded and embossed polyethylene webs and expanded polypropylene webs may be used in the same sponge structure.

The individual webs or layers of the absorbent structures should be minimally bonded to each other. While this can be accomplished by edge and spot bonding through the use of an appropriate bonding agent, it is preferred (particularly in surgical devices) to accomplish the bonding by edge and spot heat bonding, utilizing the hydrophobic thermoplastic nonwoven layers as dry adhesives. This assures that the surgical structures will be free of additional bonding agents. It is also desirable that the layers of the absorbent surgical structures be free of all additives such as surface finishes, surfactants (including wetting agents) and the like.

The absorbent structures of the present invention demonstrate excellent wet and dry bulk along with synergistic absorbency. They are further characterized by little or no lint or particulate discharge and by a cloth-like aesthetic, inclusive of quietness and good hand.

BRIEF DESCRIPTION OF THE DRAWINGS

FIG. 1 is a fragmentary, semi-diagrammatic, cross sectional view illustrating an exemplary disposable nonwoven absorbent structure of the present invention in the form of a surgical laparotomy sponge.

FIG. 2 is a fragmentary plan view of the laparotomy sponge of FIG. 1 illustrating the spot bonding thereof.

FIGS. 3 through 5 are fragmentary, semi-diagrammatic, cross sectional views illustrating various additional embodiments of laparotomy sponge.

DESCRIPTION OF THE PREFERRED EMBODIMENTS

Figure 4:
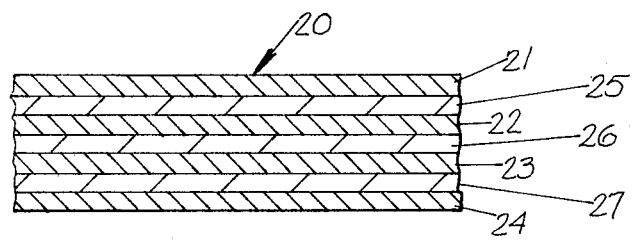

The disposable nonwoven absorbent structures of the present invention comprise alternate layers of nonwoven absorbent material and nonwoven hydrophobic thermoplastic material. The layers of absorbent nonwoven material may comprise webs of continuous filament spunbonded rayon or webs of air laid, wet laid or carded rayon fibers of staple length or longer (i.e. at least about 1.0 cm), with or without mechanical or hydraulic needling. The absorbent layers or webs should have a basis weight within the range of from about 20 to about 75 $g/m^2$ and preferably about 20 to about 35 $g/m^2$.

When the absorbent structures of the present invention take the form of surgical aids such as laparotomy sponges, it is preferred that the absorbent layers constitute webs of continuous filament spunbonded rayon. Excellent results have been achieved utilizing a continuous filament, nonwoven, spunbonded rayon web produced by Asahi Chemical Industries, Limited, of Osaka, Japan and sold under the trademark "Bemliese". This material is taught in U.S. Pat. No. 3,906,130 in the names of Takashi Tsurumi, Shuichi Emori, Kiyokazu Daigoh, Takemi Ikegami and Tutomu Kaneko, issued Sept. 16, 1975. This continuous filament, spun-bonded rayon web is particularly advantageous in that it is fabric-like, being soft, pliable, comformable and possessing excellent drape and hand. Since this web is a continuous filament web, the available particulate matter or lint which can fall off or be released from the web is greatly reduced due to the absence of fiber ends which could break off when the web is subjected to mechanical energy. The web has an excellent surface texture enabling it to readily wipe up liquids (including relatively viscous liquids) and liquids containing solids. At the same time, the surface of this web is nonabrasive to delicate tissue. "Bemliese" contains no additives such as surface finishes, surfactants (including wetting agents) or bonding agents which might leach into a wound.

Another excellent rayon web starting material is sold by E. I. Dupont de Nemours, of Wilmington, Del. under the trademark "Sontara". This rayon web comprises a carded or air laid web of staple length rayon fibers which have been hydraulically needled. This web has excellent cloth-like and surface characteristics and contains no additives or bonding agents.

When it is desired that the outermost nonwoven absorbent layers of an absorbent structure be characterized by improved tensile strength, dimensional stability and resistance to abrasion, a stabilized spunbonded rayon web or a stabilized discontinuous fiber rayon web may be used. Such stabilized rayon webs are taught in commonly owned co-pending application Ser. No. 916,220, in the names of William J. Boyd and Mary K. King, filed June 16, 1978 and entitled A STABILIZED RAYON WEB AND STRUCTURES MADE THEREFROM. Briefly, an appropriate rayon web such as "Bemliese" or a discontinuous rayon fiber web having substantial fiber orientation perpendicular to the plane of the web, is stabilized by having a thermoplastic web melted into the rayon web from the bottom surface thereof to a controlled penetration depth of from about 10% to about 40% of the thickness of the rayon web. As a result, the cross over points of the rayon fibers are effectively stabilized from the bottom surface of the web up to the controlled penetration depth therein, while the aesthetics of the upper surface of the rayon web are undisturbed.

The nonwoven hydrophobic thermoplastic layers of the absorbent structures of the present invention may constitute one or more thermoplastic webs of any appropriate polymer and any web-like structural form having an open area so as to freely pass liquid therethrough (i.e. an open area of at least about 40%). The thermoplastic web material should be hydrophobic and should have a basis weight of from about 5 to about 25 g/m². The thermoplastic web may constitute an expanded film, an extruded and embossed web, a melt blown web or a spunbonded web.

The polymers from which the nonwoven hydrophobic thermoplastic webs are made can vary widely. Polyethylene, polypropylene, ethyl vinyl acetate, ethylene methyl acrylate, polyurethane, polyester or nylon can be used. The nonwoven hydrophobic thermoplastic webs should have a relatively low melting point of from about 110° C. to about 177° C. and preferably from about 121° C. to about 149° C., if heat bonding is to be used. Polyethylene and polypropylene are of particular interest in disposable absorbent structures intended for surgical use. This is true because these polymers are generally recognized to be safe in such applications. Nonwoven hydrophobic thermoplastic webs which have been used in the disposable nonwoven absorbent structures of the present invention with excellent results are manufactured by Hercules, Inc. of Wilmington, Del., under the trademark "Delnet". "Delnet" is a thermoplastic web made by a process of extrusion, embossing and orientation. The embossing technique employed in the manufacture of this web may result in a product having a surface pattern which may be generally described as a series of hexagonal bosses connected to each other by a plurality of bars. "Delnet" has an open area of from about 45% to about 50%, which allows free passage of fluids therethrough and enhances the pliability, drape and aesthetic properties of the thermoplastic web. "Delnet" can readily be heat spot bonded to a rayon absorbent web. Good results have been obtained utilizing "Delnet" having a boss count of from about 7 to about 10 per centimeter.

Excellent results have also been achieved utilizing a thermoplastic web manufactured by PNC Corporation of Akron, Ohio, under the trademark "Sharnet". This thermoplastic material comprises an expanded and opened film of polymers of the type listed above, of blends thereof. "Sharnet" is soft, very drapable and conformable. It has an open area such as to allow the free passage of fluids therethrough and it can be readily heat spot and edge bonded to a rayon web. Good results have been achieved utilizing "Sharnet" having an open area similar to that of the above mentioned preferred form of "Delnet".

The thermoplastic material should be of such nature that when positioned between the absorbent layers it provides support therefor and void volume therebetween.

Absorbent nonwoven rayon webs in general demonstrate low wet bulk. As used herein the phrase "wet bulk" relates to the resistance to the loss of form and resiliency when wet. This is true, for example, of "Bemliese", mentioned above. It has been found, however, that when such webs are alternately plied with the nonwoven, hydrophobic, thermoplastic webs such as "Delnet" or "Sharnet", the resulting structure demonstrates wet bulk equal to or greater than equivalent structures made of gauze plies.

An exemplary disposable, nonwoven, absorbent structure is illustrated in FIG. 1. The Figure is a semi-diagrammatic cross sectional view illustrating an embodiment of a surgical laparotomy sponge. The sponge is generally indicated at 1 and comprises a plurality of nonwoven absorptive layers 2 through 5 with layers of nonwoven, hydrophobic, thermoplastic webs 6, 7 and 8 located therebetween. An exemplary laparotomy sponge of the type illustrated in FIG. 1 was made up wherein the layers 2 through 5 were "Bemliese" webs and the layers 6 through 8 were "Delnet" webs. In FIG. 1 (and FIGS. 3 through 5 to be described hereinafter) the individual webs or layers have been greatly exaggerated in thickness, for purposes of clarity.

The plies 2 through 8 of laparotomy sponge 1 should be minimally bonded together. This can be accomplished by spot bonding. The term "spot bonding" as used herein and in the claims is intended to be inclusive of continuous or discontinuous pattern bonding, uniform or random point bonding or combinations thereof, all as are well known in the art. Such spot bonding may be accomplished through the use of bonding agents. Appropriate bonding agents are numerous, readily available and their uses are well known in the art. For example, the most commonly used bonding agents are acrylic latexes, styrene butadiene copolymers, ethylene vinyl acetate or hot melt bonding agents such as polyethylene.

In many instances, and particularly in surgical sponges and the like, it is preferred to accomplish the spot bonding by means of heat spot bonding, taking advantage of the presence of the alternate hydrophobic thermoplastic layers or webs which serve as dry adhesives. This also avoids the use of additional bonding agents which constitute additives, and as indicated above, additives to the structure of the surgical sponges are generally to be avoided.

FIG. 2 is a fragmentary plan view of the structure of FIG. 1, illustrating an exemplary form of spot bonding. In FIG. 2 the laparotomy sponge is illustrated as being uniformly heat point bonded by individual point bonds 9, arranged in rows 10. The rows 10, in turn, are arranged in a decorative "chevron" pattern. The spot bonding illustrated in FIG. 2 is exemplary only. Continuous or discontinuous pattern bonding, uniform or random point bonding or combinations thereof could be used, as is well known in the art.

It will be understood by one skilled in the art that at each individual bond position, the sponge structure is stiffened and its absorptive properties are reduced. Nevertheless, when appropriately designed and positioned, the bonds 9 will cause no appreciable effect on the hand of the overall surgical sponge structure and no significant effect on its absorptive properties.

FIG. 3 illustrates a laparatomy sponge generally indicated at 11 comprising a plurality of nonwoven absorbent plies 12 through 15. The absorbent plies 12 and 13 and the absorbent plies 14 and 15 are separated from each other by nonwoven, hydrophobic, thermoplastic plies 16 and 17. The centermost absorptive layers or plies 13 and 14 are separated from each other by a pair of nonwoven, hydrophobic, thermoplastic plies 18 and 19. The plies 18 and 19 are of a different polymer than the plies 16 and 17. An example of the laparotomy sponge 11 was made up wherein all of the absorptive layers 12, 13 14 and 15, were "Bemliese" webs and hydrophobic layers 16 and 17 were "Delnet" webs. Plies 18 and 19 were identical "Sharnet" webs, positioned adjacent each other and constituting one centermost hydrophobic thermoplastic layer between absorbent layers 13 and 14.

Yet another embodiment of laparotomy sponge is generally indicated at 20 in FIG. 4. In this embodiment a plurality of absorptive layers 21 through 24 are separated by a plurality of hydrophobic thermoplastic layers 25 through 27. In an example made up in accordance with the structure of FIG. 4, the absorptive layers 21 through 24 comprised webs of "Bemliese" while the hydrophobic layers 25 through 27 comprised webs of "Sharnet". It will be apparent that the laparotomy sponge 20 of FIG. 4 is similar to laparotomy sponge 1 of FIG. 1, differing only in that "Sharnet" webs were used for the hydrophobic thermoplastic layers, rather than webs of "Delnet".

Figure 5:
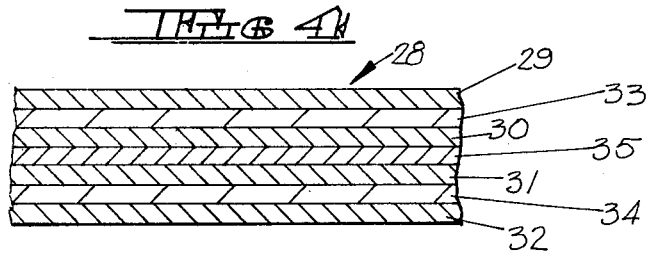

Another laparotomy sponge embodiment is generally indicated at 28 in FIG. 5. Once again, the sponge comprise a plurality of nonwoven absorbent layers 29 through 32. Layers 29 and 30 and layers 31 and 32 are separated, respectively, by nonwoven, hydrophobic, thermoplastic layers 33 and 34 of the same polymer. The centermost layer 35, separating absorbent layers 30 and 31, constitutes a nonwoven, hydrophobic, thermoplastic layer different in polymer make-up from layers 33 and 34. In an actual laparotomy sponge made in accordance with the structure 28 of FIG. 5, the absorbent layers 29 through 32 constituted "Bemliese" webs. The hydrophobic layers 33 and 34 were "Sharnet" webs while the hydrophobic layer 35 was a "Delnet" web.

In all of the embodiments of FIGS. 1 through 5, the layers or webs making up the laparotomy sponges are preferably heat spot bonded as described with respect to FIG. 2.

It will be understood by one skilled in the art that in the exemplary embodiments of FIGS. 1 through 5 that the absorbent rayon layers need not be identical to each other in structural form, basis weight, or the like. The same is true of the thermoplastic layers, as has been demonstrated. These layers may vary in polymer, structural form or basis weight. For example in laparotomy sponges of the type illustrated in FIGS. 1 and 4, the individual thermoplastic layers can vary in basis weight. FIGS. 3 and 5 demonstrate differences in polymer make-up, basis weight and structural form for the thermoplastic layers. It will further be understood that the center thermoplastic layers of FIG. 1, 4 and 5 could be made up of at least two plies as is shown in FIG. 3. Similarly FIG. 3 could have a single ply center thermoplastic layer as in the case of FIGS. 1, 4 and 5.

The outermost layers of any of the structures of FIGS. 1 through 5 can be stabilized rayon webs (as indicated above), when outermost layers characterized by improved tensile strength, dimensional stability and resistance to abrasion are particularly desired or required.

It will be understood that the larparotomy sponges 1, 11, 20 and 28 can be provided with radio opaque markers or indicators and loop tapes or handles (not shown), as is well known in the art.

Figure 6:
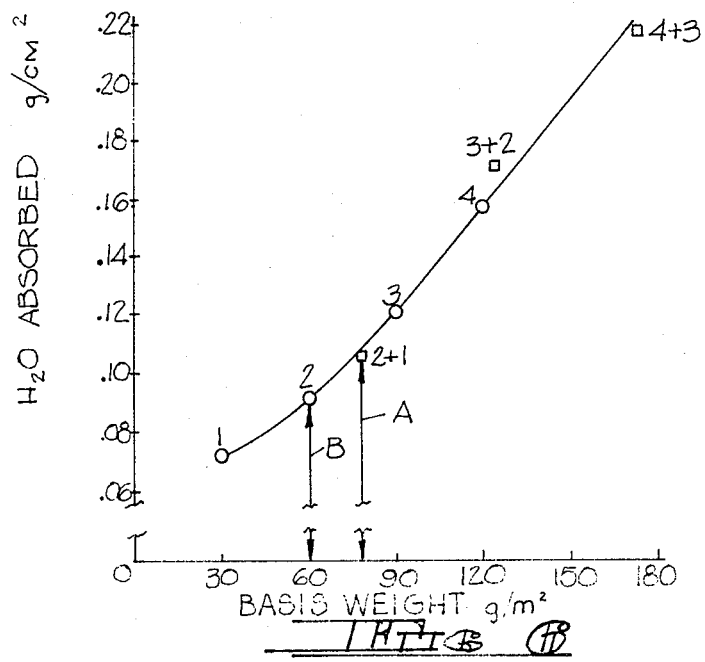
FIG. 6 is a graph plotting water absorbed in grams per square centimeter against basis weight in grams per square meter and illustrating the synergistic absorbency of the structures of the present invention.

It has been discovered that the amount of water absorbed by an absorbent structure can be increased by adding to that structure alternating layers of non-absorbent material. The amount of water absorbed by the structure is increased by an amount at least as great as if more absorbent material had been added to the structure. This is illustrated by the graph of FIG. 6 which shows the result of plying up to 4 layers of "Bemliese", each of a basis weight of 30 g/m$^2$. Each layer of "Bemliese" is indicated by a small circle. The graph also shows (by means of small squares) the result of adding up to 3 layers of polyethylene "Delnet", each having a basis weight of 18 g/m$^2$. As can be noted, additional water is absorbed due to the addition of the non-absorbent material as if an equivalent basis weight of the absorbent material has been added. Thus, it is apparent from FIG. 6 that this synergistic absorbency can be stated as follows:

S (absorbency) = A/B

Where: S (absorbency) = the synergistic absorbency;
A = is the water absorbed by the structure comprising alternate absorbent and non-absorbent layers; and
B = is the water absorbed by a structure having the same number of absorbent layers without intervening non-absorbent layers.

In general, the synergistic absorbency for the structures of the present invention is in the range of from about 1.1 to about 1.4.

An additional benefit of the structures of the present invention, with respect to this synergistic absorbency, is that the magnitude of the synergism is increased by a factor relating to the number of non-absorbent layers present.

It has also been found that the alternating plies of the non-absorbent material increase the rate at which water is wicked into the structure. This unexpected result constitutes a wicking rate synergism and may be defined as follows:

S (wicking rate) = $R_2/R_1$

Where: S (wicking rate) = the synergistic wicking rate;
$R_2$ = the instantaneous initial rate at which water is taken into the structure comprising alternating absorbent and non-absorbent layers; and
$R_1$ is the instantaneous initial rate at which water is taken into a structure having the same number of absorbent layers without intervening non-absorbent layers.

In general the synergistic wicking rate for the structures of the present invention is the range of from about 1.3 to about 1.9.

TEST PROCEDURES

The test procedures used to determine the unique properties of the disposable, nonwoven, absorbent structures of the present invention and to engender the test results provided below are as follows:

ABSORBENT CAPACITY AND WICKING RATE DETERMINED AT ZERO HYDROSTATIC HEAD

The absorbent capacity in grams of water absorbed per grams of sample tested and the rate at which the water is absorbed in grams of water per second is determined using the method described by Bernard M. Lichstein in SYMPOSIUM PAPERS—TECHNICAL SYMPOSIUM—NONWOVEN PRODUCT TECHNOLOGY, Mar. 5–6, 1974, Shoreham Americana, Washington, D.C., pp. 129–142. Exceptions to the method described are: (1) the use of a pressure applied to the sample of 34 newtons per square meter, and (2) the causing of a portion of the sample to momentarily contact the water meniscus to thereby initiate wicking, rather than momentarily pumping the water to the sample. For these determinations, high numbers are desired.

WORK TO BREAK TEST

A 5.1 cm wide strip of the materials for which these properties are to be determined is tested in an Instron Table Model TM with a tension load cell "C" (range 4.4–22.2 newtons). All test samples are conditioned at least 12 hours at 23°±1° C. and 50±2% relative humidity. An initial jaw spacing of 5.08 cm is used together with a crosshead speed of 5.08 centimeters per minute. Work to complete break is reported in joules per square meter. A high value is desired.

DRY LINT RELEASE TEST

This test uses an electric clothes dryer (without heat), with modifications, and measures the lint or particulate matter released by the test sample in milligrams per square meter. The samples to be tested are conditioned for at least 12 hours at 23°±1° C. and 50±2% relative humidity. The modifications to the electric dryer include a baffle arrangement to increase sample tumbling action and the use of one-way intake and exhaust filters designed to catch only lint or particulate material released from the test sample. The test sample is allowed to tumble for exactly 30 minutes. Low values are desired.

EXAMPLES

The following are examples of structures made in accordance with the teachings of the present invention.

EXAMPLE 1

A laparotomy sponge of the type illustrated at 1 in FIG. 1 was constructed. The absorbent layers 2 through 5 each comprised an unstablized "Bemliese" web having a basis weight of 30 g/m². The hydrophobic thermoplastic plies 6 through 8 were polyethylene "Delnet" webs having a basis weight of 18 g/m². The structure was heat spot bonded as described with respect to FIG. 2.

EXAMPLE 2

A laparotomy sponge was assembled in the manner illustrated in FIG. 3. In this sponge, the absorbent layers 12 through 15 were unstabilized "Bemliese" webs having a basis weight of 30 g/m². The hydrophobic thermoplastic layers 16 and 17 were polyethylene "Delnet" webs having a basis weight of 18 g/m². The centermost hydrophobic thermoplastic layers 18 and 19 were polypropylene "Sharnet" webs each having a basis weight of 6 g/m² for a total basis weight of 12 g/m² for the centermost hydrophobic thermoplastic layer 18–19. The structure was heat spot bonded in the manner described with respect to FIG. 2.

EXAMPLE 3

A laparotomy sponge was made up after the manner illustrated in FIG. 4. In this sponge, the absorbent layers 21 through 24 constituted unstabilized "Bemliese" webs having a basis weight of 30 g/m². The hydrophobic thermoplastic layers 25 through 27 were polypropylene "Sharnet" webs each having a basis weight of 6 g/m². The structure was heat spot bonded as described with respect to FIG. 2.

EXAMPLE 4

A laparotomy sponge of the type illustrated at 28 in FIG. 5 was made up wherein the absorbent layers 29 through 32 were unstabilized "Bemliese" of a basis weight of 30 g/m². The hydrophobic thermoplastic layers 33 and 34 were polypropylene "Sharnet" webs of a basis weight each of 6 g/m² and the centermost hydrophobic thermoplastic layer 50 was a polyehtylene "Delnet" web having a basis weight of 18 g/m². The structure was heat spot bonded as described with respect to FIG. 2.

The structures of Examples 1 through 4 were compared to a conventional, commercially available cotton gauze laparotomy sponge from the standpoints of absorbent capacity and wicking rate at zero hydrostatic head, work to break and linting. The exemplary cotton gauze laparotomy spone was a 4-ply sponge sold by Kendall Hospital Products of Boston, Mass. under the mark "Kerlix." The gauze sponge was a single-use product having been washed, vacuumed and sterilized so as to be ready for use. The results of these comparisons are summarized in Tables I and II below:

TABLE I

| Sample | Absorbent Capacity At Zero Hydrostatic Head (g/g) | Wicking Rate At Zero Hydrostatic Head (g/sec) |
|---|---|---|
| Cotton Gauze Sponge | 4.0 | 0.04 |
| Example 1 Sponge | 11.8 | 0.38 |
| Example 2 Sponge | 11.8 | 0.22 |
| Example 3 Sponge | 12.8 | 0.27 |
| Example 4 Sponge | 13.8 | 0.24 |

TABLE II

| Samples | Work to Break (joules/m$^2$) | | | | Lint (mg/m$^2$) | Basis Weight (g/m$^2$) |
|---|---|---|---|---|---|---|
| | Dry | | Wet | | | |
| | MD | CD | MD | CD | | |
| Cotton Gauze Sponge | 701 | 350 | 858 | 403 | 128 | 114 |
| Example 1 Sponge | 1699 | 1367 | 1121 | 1051 | 7 | 174 |
| Example 2 Sponge | 1156 | 1314 | 841 | 420 | 7 | 170 |
| Example 3 Sponge | 1156 | 1139 | 718 | 666 | 7 | 141 |
| Example 4 Sponge | 1284 | 1367 | 818 | 922 | 7 | 152 |

It can be seen that the Examples of the present invention have much improved absorption and linting properties and improved strength as measured by work to break.

Modifications can be made in the present invention without departing from the spirit of it. For example, mechanical treatment such as compaction or creping, when required, may be employed to enhance the softness, pliability, and conformability of the structures of the present invention.

The spunbonded or discontinuous fiber rayon absorbent layers of the present invention, while preferably all rayon, may contain other filaments or fibers in an amount such that they will not detract from the performance and aesthetics of the absorbent rayon layers.

The embodiments of the invention in which an exclusive property or privilege is claimed are defined as follows:

1. An absorbent nonwoven structure free of added binders comprising alternate layers of nonwoven absorbent material and nonwoven hydrophobic thermoplastic material free of wetting agents, the outermost layers of said structure comprising layers of said nonwoven absorbent material, said structure having a number of said nonwoven absorbent material layers greater by one than the number of said nonwoven hydrophobic thermoplastic material layers, each of said nonwoven thermoplastic layers having a basis weight of from about 5 to about 25 grams per square meter and an open area of at least 40%, said nonwoven absorbent material and thermoplastic material layers of said structure being spot bonded together, each of said alternating thermoplastic layers being of such structure as to provide support for the adjacent ones of said absorbent layers and void volume within itself and between itself and said adjacent ones of said absorbent layers whereby the absorbency of said nonwoven structure is increased.

2. The structure claimed in claim 1 wherein at least one of said nonwoven absorbent layers comprises a spunbonded continuous filament rayon web having a basis weight of from about 20 to about 75 grams per square meter.

3. The structure claimed in claim 1 wherein at least one of said nonwoven absorbent layers comprises a web of discontinuous rayon fibers of at least staple length chosen from the class consisting of an air laid web, a wet laid web, a carded web, an air laid and mechanically needled web, a carded and mechanically needled web, an air laid and hydraulically needled web, a wet laid and hydraulically needled web and a carded and hydraulically needled web, said at least one discontinuous fiber rayon web having a basis weight of from about 20 to about 75 grams per square meter.

4. The structure claimed in claim 1 wherein said outermost nonwoven absorbent layers each comprise a stabilized rayon web whereby to improve their tensile strength, dimensional stability and resistance to abrasion.

5. The structure claimed in calim 1 wherein said nonwoven hydrophobic thermoplastic layers each comprise at least one web chosen from the calss consisting of an expanded film web, an extruded and embossed web, a melt blown web and a spunbonded web made from a polymer chosen from the class consisting of polyethylene, polypropylene, ethyl vinyl acetate, ethylene methyl acrylate, polyester, nylon and polyurethane.

6. The structure claimed in claim 1 wherein said absorbent structure is intended for surgical uses, said nonwoven absorbent layers each comprising a spunbonded rayon web having a basis weight of from about 20 to about 75 grams per square meter and said nonwoven hydrophobic thermoplastic layers each comprising at least one web made from a polymer chosen from the class consisting of polypropylene and polyethylene.

7. The structure claimed in. claim 1 wherein said absorbent structure comprises a disposable laparotomy sponge, said nonwoven absorbent layers comprising webs chosen from the class consisting of continuous filament spunbonded rayon webs and webs of discontinuous rayon fibers of at least staple length, said rayon webs having a basis weight of from about 20 to about 75 grams per square meter, said nonwoven hydrophobic thermoplastic layers each comprising at least one web made from a polymer chosen from the class consisting of polyethylene and polypropylene.

8. The structure claimed in claim 7 wherein each of said absorbent layers comprises a continuous filament spunbonded rayon web and each of said nonwoven hydrophobic thermoplastic layers comprises a polyethylene web.

9. The structure claimed in claim 7 wherein each of said absorbent layers comprises a continuous filament spunbonded web and each of said nonwoven hydrophobic thermoplastic layers comprises a polypropylene web.

10. The structure claimed in claim 7 wherein said nonwoven absorbent layers comprise four continuous filament spunbonded rayon webs each having a basis weight of 30 grams per square meter, said nonwoven hydrophobic thermoplastic layers comprising two polyethylene webs each having a basis weight of 18 grams per square meter and two polypropylene webs having a basis weight of 6 grams per square meter, said polyethylene webs each being located between an outermost one of said spunbonded rayon webs and the next adjacent one of said spunbonded rayon webs, said polypropylene webs being adjacent each other and constituting together the centermost nonwoven hydrophobic thermoplastic layer of said laparotomy sponge.

11. The structure claimed in claim 7 wherein said nonwoven absorbent layers comprise four continuous filament spunbonded rayon webs each having a basis weight of 30 grams per square meter, said nonwoven hydrophobic thermoplastic layers comprising two polypropylene webs each having a basis weight of 6 grams per square meter and a and a polyethylene web having a basis weight of 18 grams per square meter, said polyproylene webs each being located between an outermost one of said spunbonded rayon webs and the next adjacent one of said spunbonded rayon webs, said polyethylene web comprising the centermost nonwoven hydrophobic thermoplastic layer of said laparotomy sponge.

12. The structure claimed in claim 8 including four of said spunbonded rayon webs each having a basis weight of 30 grams per square meter and three of said polyethylene webs each having a basis weight of 18 grams per square meter.

13. The structure claimed in claim 9 including four of said spunbonded rayon webs each having a basis weight of 30 grams per square meter and three of said polypropylene webs each having a basis weight of 6 grams per square meter.

* * * * *

UNITED STATES PATENT AND TRADEMARK OFFICE
CERTIFICATE OF CORRECTION

PATENT NO. : 4,287,251
DATED : September 1, 1981
INVENTOR(S) : MARY K. KING and WILLIAM J. BOYD It is certified that error appears in the above-identified patent and that said Letters Patent are hereby corrected as shown below:

Title Page, the Assignee, should read -- The Buckeye Cellulose Corporation --.

Column 7, lines 45-46, "comprise" should read -- comprises --.

Column 8, line 5, "FIG." should read -- FIGS. --.

Column 10, line 46, "spone" should read -- sponge --.

Column 12, line 8, "calim" should read -- claim --.

Column 12, line 10, "calss" should read -- class --.

Column 12, line 65, delete "and a", second occurrence.

Column 12, lines 65-66, "polyroylene" should read -- polypropylene --.

Signed and Sealed this

Sixteenth Day of February 1982

[SEAL]

Attest:

GERALD J. MOSSINGHOFF

Attesting Officer

Commissioner of Patents and Trademarks